(12) United States Patent
Turner

(10) Patent No.: US 9,120,657 B1
(45) Date of Patent: Sep. 1, 2015

(54) POWER HAND TRUCK

(71) Applicant: Victor L. Turner, Detroit, MI (US)

(72) Inventor: Victor L. Turner, Detroit, MI (US)

( * ) Notice: Subject to any disclaimer, the term of this patent is extended or adjusted under 35 U.S.C. 154(b) by 0 days.

(21) Appl. No.: 14/332,146

(22) Filed: Jul. 15, 2014

(51) Int. Cl.
*B66F 9/075* (2006.01)
*B62B 1/10* (2006.01)
*B62B 5/00* (2006.01)

(52) U.S. Cl.
CPC ............ *B66F 9/07504* (2013.01); *B62B 1/10* (2013.01); *B62B 5/0033* (2013.01); *B66F 9/07572* (2013.01)

(58) Field of Classification Search
CPC ............ B62B 1/10–1/16; B60K 1/00; B60K 2001/001–2001/006
See application file for complete search history.

(56) References Cited

U.S. PATENT DOCUMENTS

| | | | | |
|---|---|---|---|---|
| 3,229,830 A * | 1/1966 | Smith | | 414/542 |
| 3,735,831 A * | 5/1973 | Gray | | 180/19.1 |
| 3,896,893 A * | 7/1975 | Willis et al. | | 180/19.1 |
| D246,774 S | 12/1977 | Esposito | | |
| 4,429,758 A * | 2/1984 | Meshulam | | 180/19.3 |
| 4,448,434 A * | 5/1984 | Anderson | | 280/40 |
| 4,550,924 A * | 11/1985 | Alber | | 280/5.28 |
| 4,570,732 A * | 2/1986 | Craven | | 180/19.3 |
| 4,960,179 A | 10/1990 | Leach | | |
| 5,370,572 A * | 12/1994 | Lee | | 446/462 |
| 5,647,720 A * | 7/1997 | Golicz et al. | | 414/490 |
| 5,657,828 A * | 8/1997 | Nagamachi | | 180/19.3 |
| 5,685,385 A * | 11/1997 | Sanuga | | 180/65.1 |
| 5,860,485 A * | 1/1999 | Ebbenga | | 180/19.2 |
| 6,039,332 A * | 3/2000 | Austin | | 280/47.17 |
| 6,062,328 A * | 5/2000 | Campbell et al. | | 180/65.6 |
| 6,659,565 B2 * | 12/2003 | Brant | | 298/1 C |
| 7,137,464 B2 * | 11/2006 | Stahler, Sr. | | 180/8.2 |
| 7,163,213 B2 * | 1/2007 | Chambers | | 280/47.131 |
| 2003/0134707 A1 * | 7/2003 | Goldie et al. | | 475/149 |
| 2005/0230928 A1 * | 10/2005 | Raney | | 280/19.1 |
| 2008/0224433 A1 * | 9/2008 | Setzer et al. | | 280/47.131 |
| 2010/0078233 A1 * | 4/2010 | Fletcher et al. | | 180/19.1 |
| 2012/0083376 A1 * | 4/2012 | Lo | | 475/149 |

* cited by examiner

*Primary Examiner* — Jeffrey J Restifo
*Assistant Examiner* — Erez Gurari

(57) ABSTRACT

The present invention features a powered hand truck including a flat base, a first frame and a second frame, a first back brace, a first handle and a second handle, a drive axis, an electric motor, a battery, a shift box, a power switch, a first wheel and a second wheel. The drive axle may optionally include a differential allowing easy turning of the hand truck. The battery is replaceable and rechargeable to provide power to the hand truck. A power switch control the ON/OFF of the motor. The shift control box has a Forward, Reverse and Neutral gears section for controlling the motor. The motor further provides regenerative braking to charge battery when the shift is set as Neutral. The powered hand truck may include a recharger port for battery recharging.

6 Claims, 4 Drawing Sheets

FRONT ISO

REAR ISO

SIDE VIEW

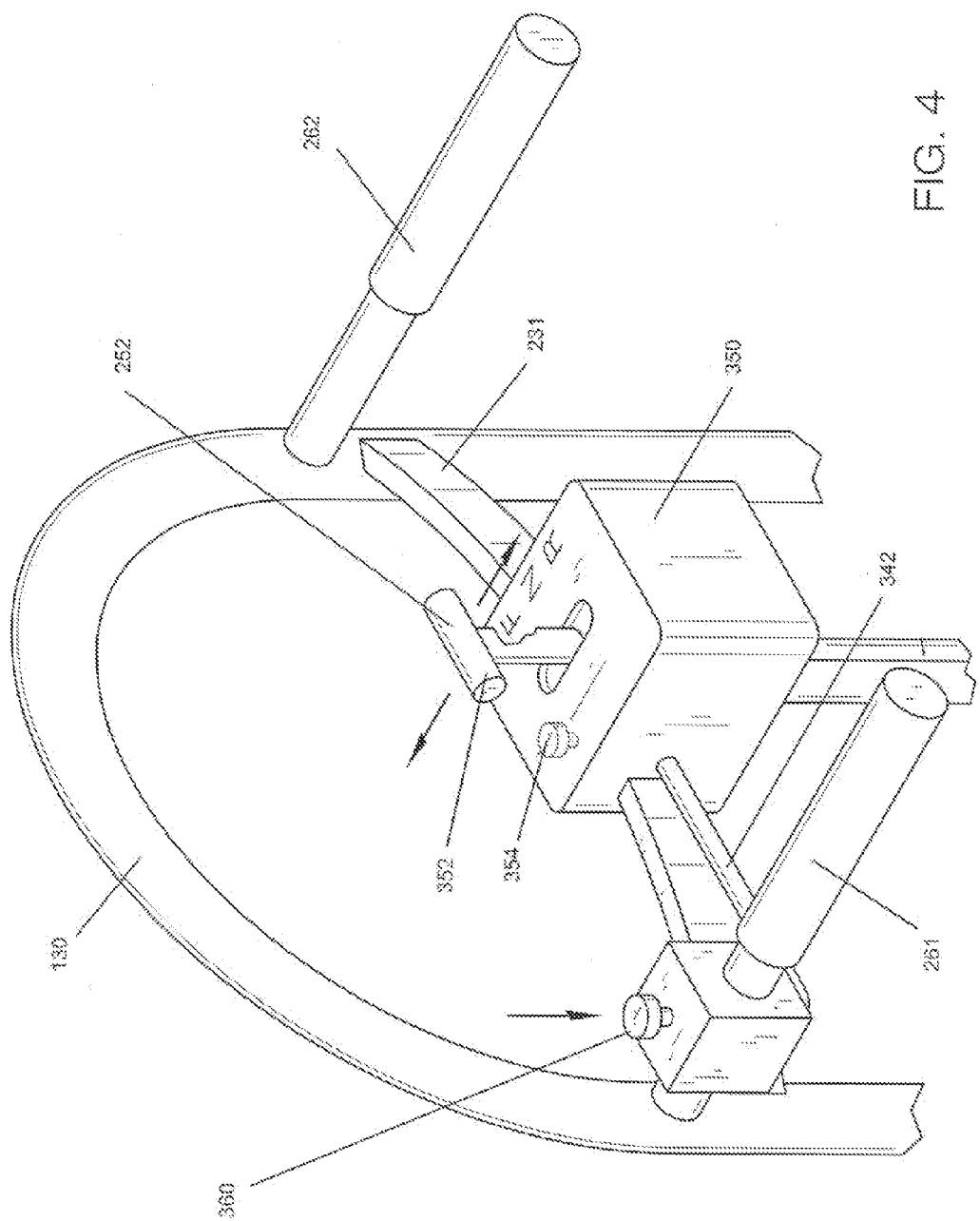

POWER HAND TRUCK

FIELD OF THE INVENTION

The present invention relates to a hand truck, and more particularly to a powered hand truck.

BACKGROUND OF THE INVENTION

A hand truck, also known as a two-wheeler or dolly, trolley is an L-shaped box-moving handcart with handles at one end, wheels at the base, with a small ledge to set objects on. The ledge is inserted underneath the load to be carried, then the truck and object are tilted backward until the weight is balanced over the large wheels, making otherwise bulky and heavy objects easier to move. Hand truck is widely used in various areas such as furniture moving, package delivery, etc.

However, most hand truck are not powered which requires extra strength to carry heavy load, especially when a user has to carry the load to an upward ramp. The user will need strength to balance the load and push the truck up. An extensive work on a hand truck would result in the use suffering some muscle pain. Therefore, there is always a need for a powered hand truck which can assist the user to carry heavy load so that the user will only need to focus on load balance.

SUMMARY OF THE INVENTION

The present invention features a powered hand truck including a flat base, a first frame and a second frame, a first back brace, a first handle and a second handle, a drive axis, an electric motor, a battery, a shift box, a power switch, a first wheel and a second wheel. The drive axle may optionally include a differential allowing easy turning of the hand truck. The battery is replaceable and rechargeable to provide power to the hand truck. A power switch control the ON/OFF of the motor. The shift control box has a Forward, Reverse and Neutral gears section for controlling the motor. The motor further provides regenerative braking to charge battery when the shift is set as Neutral. The powered hand truck may include a recharger port for battery recharging.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE DRAWINGS

FIG. 4 shows a closer view of the shift box and power switch.

DESCRIPTION OF PREFERRED EMBODIMENTS

Figure 1:
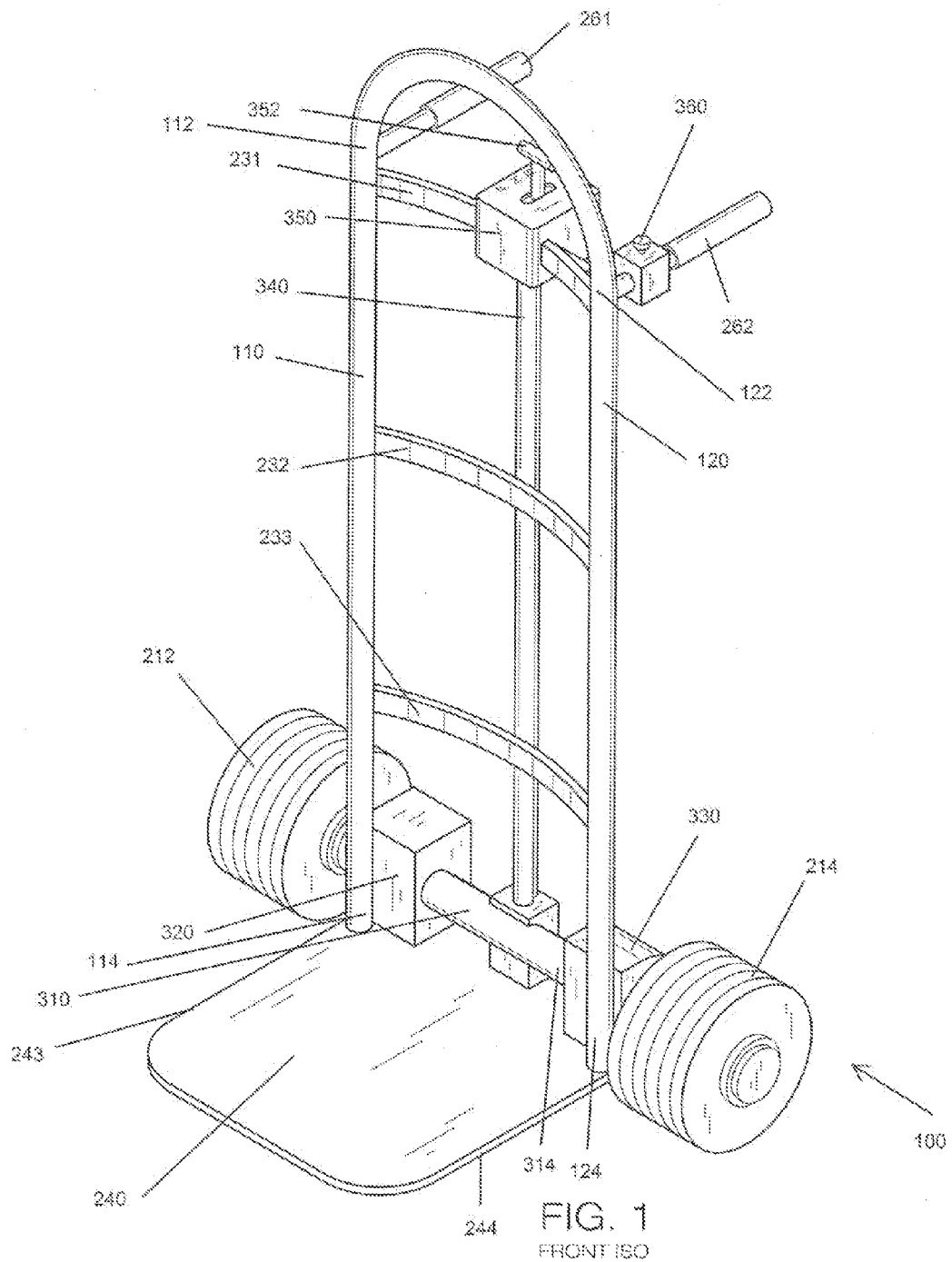
FIG. 1 shows a front isometric view of a powered hand truck.
Figure 2:
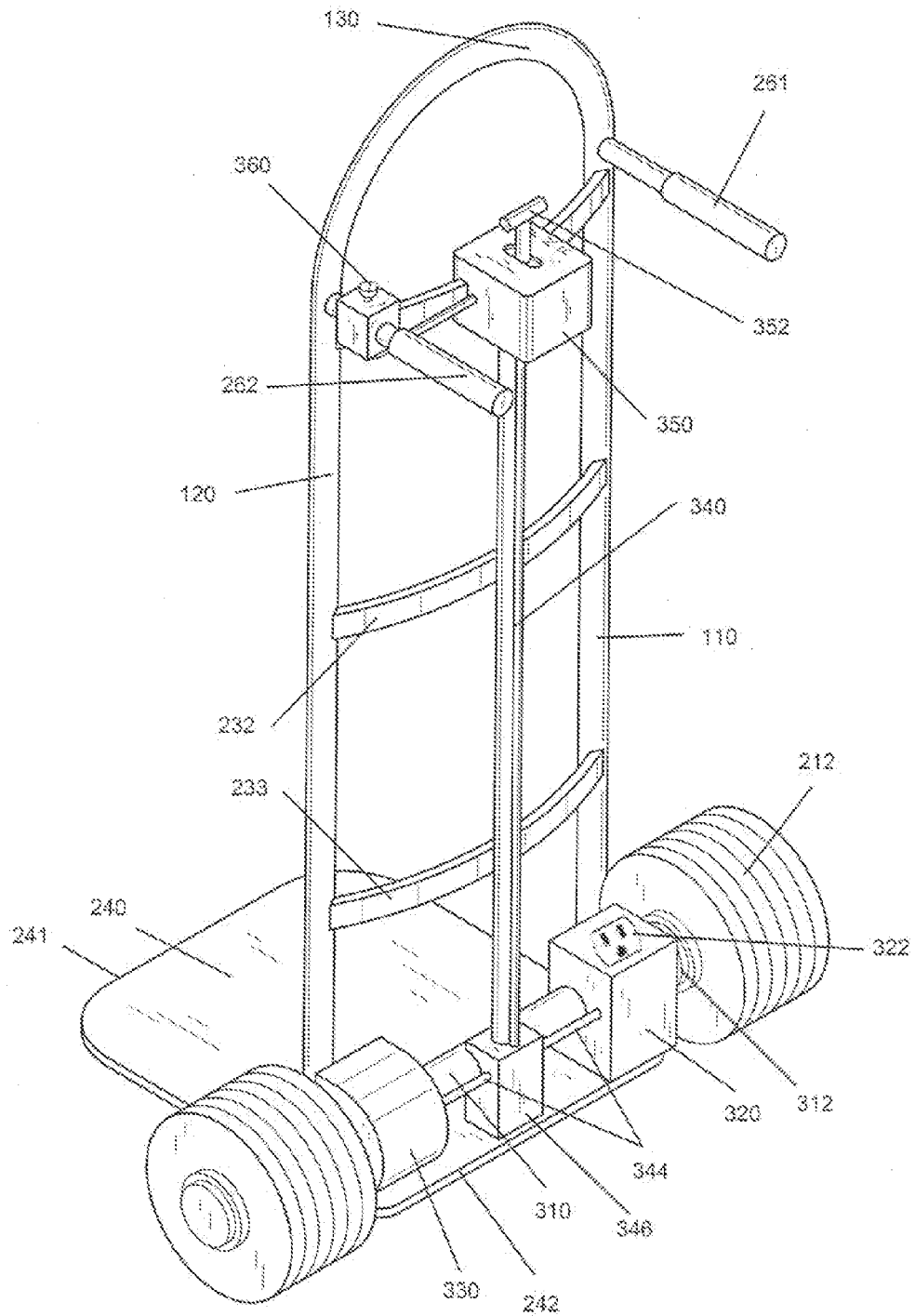
FIG. 2 shows a rear isometric view of the powered hand truck.
Figure 3:
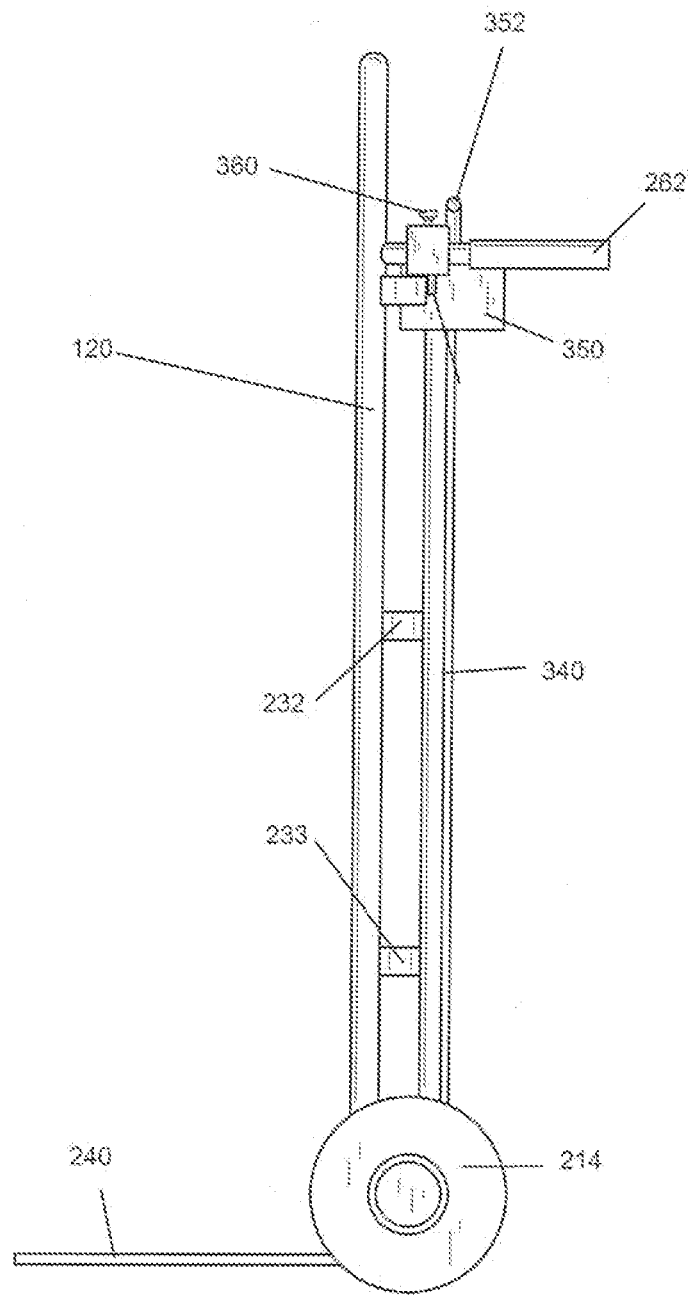
FIG. 3 shows a side view of the powered hand truck.

Referring now to FIGS. 1-4, the present invention features a powered hand truck (100) comprising a flat base (240), a first frame (110) and a second frame (120), a first back brace (231), a first handle (261) and a second handle (262), a drive axis (310), an electric motor (330), a battery (320), a shift box (350), a power switch (360), a first wheel (212) and a second wheel (214).

The flat base (240) has a front side (241), a back side (242), a first side (243) and a second side (244). The first frame (110) is parallel to the second frame (120), wherein the first frame (110) has a first upper end (112) and a first lower end (114), wherein the second frame (120) has a second upper end (122) and a second lower end (124); wherein the first lower end (114) is disposed on the flat base (240) adjacent to the first side (243) and back side (242) of the base (240), wherein the second lower end (124) is disposed on the flat base (240) adjacent to the second side (243) and back side (242) of the base (240). In some embodiments, the powered hand truck (100) further comprises a third frame (130) to connect the first upper end (112) of the first frame (110) and the second upper end (122) of the second frame (120) to provide extra mechanical rigidity of the truck (100). In some embodiments, the third frame, (130) is an arc-shaped frame.

The first back brace (231) disposed between the first frame (110) and the second frame (120), wherein the first back brace (231) connects the first upper end (112) of the first frame (110) and the second upper end (122) of the second frame (120). In some embodiments, the powered hand truck (100) further comprises a second back brace (232) and a third back brace (233) disposed between the first frame (110) and the second frame (120). The second back brace (232) and third back brace (233) are located between the first back brace (231) and the flat base (240).

This first handle (261) is secured adjacent to the first upper end (112) of the first frame (110). The second handle (262) is secured adjacent to the first upper end (112) of the first frame (110) adjacent.

The drive axis (310) has a first axis end (312) and a second axis end (314), wherein the first axis end (312) secured to the first frame (110) adjacent to the first lower end (114), wherein the second axis end (314) secured to the second frame (120) adjacent to the second lower end (124). An electric motor (330) is disposed at the second axis end (314). The battery component (320) is securely attached to the drive axis (310) adjacent to the first axis end (312); wherein the battery component (320) is functioned to power the electric motor. The first wheel (212) is disposed at the first axis end (312) and the second wheel (214) is disposed at the second axis end (314).

The shift box (350) is secured to the first back brace (231); wherein a shift control means (352) is disposed on the shift box to select a shift position among Forward or Reverse settings. The power switch (360) is secured to the first handle (261) or the second handle (262). The electric motor (330) is electrically connected to the power switch (360), shift box (350), and battery component (320); wherein after the power switch (360) is activated and when the shift control mans (352) is set as Forward, the electric motor is energized and drives the first wheel (212) and second wheel (214) forward through the drive axis (310); wherein after the power switch (360) is activated and when the shift control means (352) is set as Reverse, the electric motor is energized and drives the first wheel (212) and second wheel (214) backward through the drive axis (310). The Forward and Reverse function provides additional maneuverability for the truck, especially when there is limited space for the truck with a large size load to have a 180 degree turn. In some embodiments, the drive axis has a differential to enhance maneuverability to turn the truck. The differential is well known to one of the ordinary skill in the art.

In some embodiments, the shift box (350) further comprises a Neutral setting for the shift control means (352) to select, wherein after the power switch (360) is activated and when the shift control level (352) is set as Neutral, the electric motor (330) functions as a generator instead of a motor driving the first wheel (212) and second wheel (214), the movement of the first wheel (212) and second wheel (214) drive the electric motor (330) to recharge the battery component (320). This feature is helpful when a user is using the truck to carry a load on a downward ramp where additional motor driving is not needed, he/she can select the Neutral shift setting to recharge the battery. Furthermore, the electric motor can provide brake function when functioning as a generator to charge the battery component.

In some embodiments, the battery component (320) is rechargeable. In some embodiments the battery component (320) has a power recharge port (322) for the connection of external power source for battery recharge.

In some embodiments, the shift control means (352) is a selection gear. In some embodiments, the shift control means (352) is a three-way switch or a set of buttons for Forward, Neutral and Reverse, wherein only one button can be activated.

In some embodiments, a first conduit (340) is disposed between the shift box (350) and a connection box (346), wherein the connection box is attached to the drive axis (310) between the first axis end (312) and second axis end (314), wherein a second conduit (342) is disposed between the shift box (350) and power switch (360) to protect an electrical connection between the shift box (350) and power switch (360), wherein a third conduit (344) is disposed between the connection box (350) and the battery component (320) and the electric motor (330), wherein the first conduit (340) and third conduit (344) are functioned to protect electric connection among the shift box (350), battery component (320) and electric motor (330).

In some embodiments, the first conduit (340), second conduit (342) and third conduit (344) are made of hard materials, such aluminium pipe, plastic pipe, etc to protect electric wire connections from damage by truck loads, or prevent electric connection being shot in raining weathers.

In some embodiments, the electric motor (330) provides a fixed driving speed when the shift control means (352) is in Forward or Reverse setting. In some embodiment, the fixed speed is 5 miles/hour. In some embodiment, the fixed speed is 8 miles/hour. In some embodiment, the electric motor (330) provides a variable driving speed when the shift control means (352). The driving speed is adjusted by rotating a speed control knob (354). The speed control knob (354) is disposed on the shift box (350) and is electrically connected to the battery (320) and electric motor (330).

As used herein, the term "about" refers to plus or minus 10% of the referenced number. For example, a 5 miles/hour speed referred to speed from 4.5 miles/hour to 5.5 miles/hour.

The disclosures of the following U.S. Patents are incorporated in their entirety by reference herein: U.S. Pat. No. 5,657,828, U.S. Pat. No. 6,062,328, U.S. Pat. No. 6,659,565, U.S. Pat. No. 7,163,213, U.S. Pat. D246774 and U.S. Pat. No. 4,960,179.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:

1. A powered hand truck (100) comprising:
   (a) a flat base (240) having a front side (241), a back side (242), a first side (243) and a second side (244),
   (b) a first frame (110) and a second frame (120), wherein the first frame (110) is parallel to the second frame (120), wherein the first frame (110) has a first upper end (112) and a first lower end (114), wherein the second frame (120) has a second upper end (122) and a second lower end (124); wherein the first lower end (114) is disposed on the flat base (240) adjacent to the first side (243) and back side (242) of the base (240), wherein the second lower end (124) is disposed on the flat base (240) adjacent to the second side (243) and back side (242) of the base (240);
   (c) a first back brace (231) disposed between the first frame (110) and the second frame (120), wherein the first back brace (231) connects the first upper end (112) of the first frame (110) and the second upper end (122) of the second frame (120);
   (d) a first handle (261) secured adjacent to the first upper end (112) of the first frame (110), a second handle (262) secured adjacent to the first upper end (112) of the first frame (110) adjacent;
   (e) a drive axis (310) having a first axis end (312) and a second axis end (314), wherein the first axis end (312) secured to the first frame (110) adjacent to the first lower end (114), wherein the second axis end (314) secured to the second frame (120) adjacent to the second lower end (124);
   (f) an electric motor (330) disposed at the second axis end (314);
   (g) a battery component (320) securely attached to the drive axis (310) adjacent to the first axis end (312); wherein the battery component (320) is functioned to power the electric motor;
   (h) a first wheel (212) disposed at the first axis end (312), a second wheel (214) disposed at the second axis end (314);
   (i) a shift box (350) secured to the first back brace (231); wherein a shift control means (352) is disposed on the shift box to select a shift position among Forward or Reverse settings;
   (j) a power switch (360) secured to the first handle (261) or the second handle (262);
   wherein the electric motor (330) is electrically connected to the power switch (360), shift box (350), and battery component (320); wherein after the power switch (360) is activated and when the shift control mans (352) is set as Forward, the electric motor is energized and drives the first wheel (212) and second wheel (214) forward through the drive axis (310); wherein after the power switch (360) is activated and when the shift control means (352) is set as Reverse, the electric motor is energized and drives the first wheel (212) and second wheel (214) backward through the drive axis (310).

2. The powered hand truck of claim 1, wherein the battery component (320) is rechargeable.

3. The powered hand truck of claim 2, wherein the shift box (350) further comprises a Neutral setting for the shift control means (352) to select, wherein after the power switch (360) is activated and when the shift control level (352) is set as Neutral, the electric motor (330) functions as a generator instead of a motor driving the first wheel (212) and second wheel (214), the movement of the first wheel (212) and second wheel (214) drive the electric motor (330) to recharge the battery component (320).

4. The powered hand truck of claims 1 and 3, wherein the shift control means (352) is a selection gear.

5. The powered hand truck of claim 2, wherein the battery component (320) has a power recharge port (322) for the connection of external power source for battery recharge.

6. The powered hand truck of claim 1, wherein a first conduit (340) is disposed between the shift box (350) and a connection box (346), wherein the connection box is attached to the drive axis (310) between the first axis end (312) and second axis end (314), wherein a second conduit (342) is disposed between the shift box (350) and power switch (360) to protect an electrical connection between the shift box (350) and power switch (360), wherein a third conduit (344) is disposed between the connection box (350) and the battery component (320) and the electric motor (330), wherein the first conduit (340) and third conduit (344) are functioned to protect electric connection among the shift box (350), battery component (320) and electric motor (330).

\* \* \* \* \*